Nov. 5, 1940.   E. H. PIRON   2,220,581
SPRING SHIELD
Filed Aug. 16, 1938

Emil H. Piron
INVENTOR

BY J. Windsor Davis
ATTORNEY

Patented Nov. 5, 1940

2,220,581

UNITED STATES PATENT OFFICE 2,220,581

SPRING SHIELD

Emil H. Piron, New York, N. Y., assignor to Transit Research Corporation, a corporation of New York Application August 16, 1938, Serial No. 225,183

18 Claims. (Cl. 267—63)

This invention relates to springs of the type employing rubber or its equivalent, in shear, as the springing medium and more particularly to a shield therefor which may be employed solely as a protective means against the entry of dirt, oil, salt water or other material extraneous to the rubber, or which may act also with the added function of damping the movements of the spring.

Springs of the type herein contemplated are often subjected to uses wherein deleterious matter may collect against the metal parts or the rubber, or both. This is particularly true of vehicle springs, which is the use most important to applicant, where the springs may be exposed to the ultra violet rays of sunlight, to oil, to salty water resulting from throwing salt on the streets to melt snow and ice, and the like. It is, therefore, an object of the invention to provide a shield for each side of, or, for the top or bottom of such springs, depending upon the direction of their axes, which will effectively guard the spring against the entry of extraneous matter, and which can be made to completely seal the spring, or which can be provided with an opening to allow the entry and exit of air.

As will hereinafter appear, the shields resemble a diaphragm or bellows and may be proportioned in stiffness and in shape to perform work on the enclosed body of air by virtue of the motions of the spring during normal springing functions. It is, therefore, another object of the invention to provide a spring of the type described incorporating means for permitting a displacement of the air by the shield and, more particularly, to incorporate air passages through the spring in order that one or both of the shields may be employed as an air pump.

More particularly, it is an object to provide a spring and shields therefor such that air displaced by the movement of the springs, the displacement thereof being resisted by the restricted size of the passageway through the springs, is employed as a motion damping means, the amount of damping thus obtained being predeterminable by the shaft and size of the shields and by the size and arrangement of the air passages.

Figure 1:
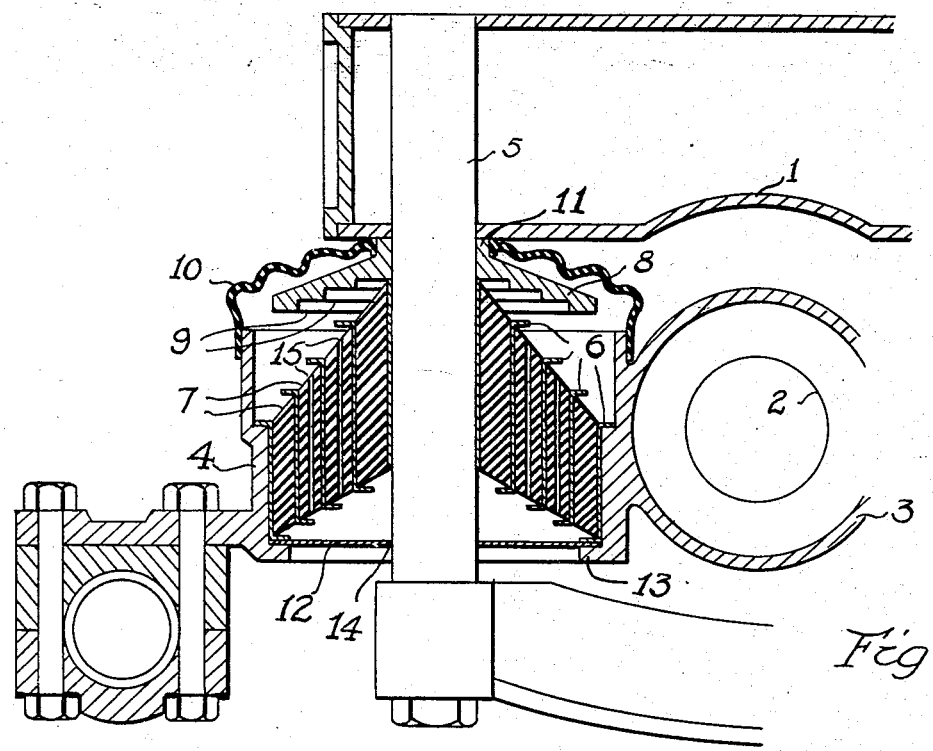
Figure 2:
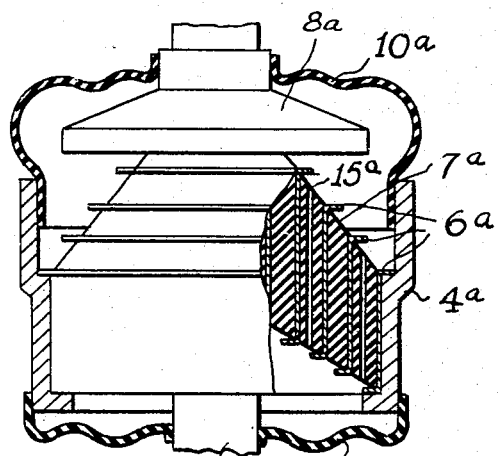
Figure 3:
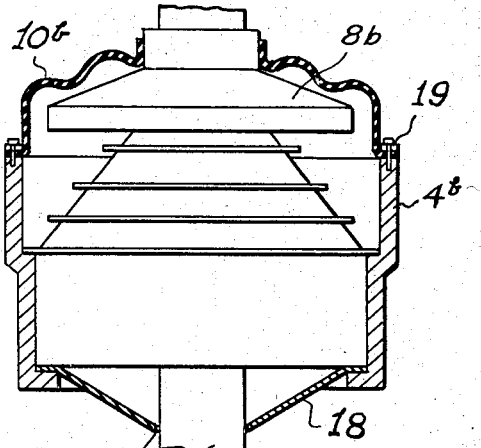
Figures 4, 5:
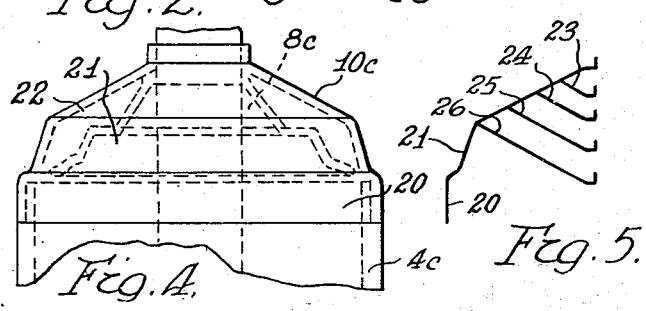

Other objects and advantages will become more fully apparent as reference is had to the accompanying drawing wherein my invention is illustrated, and in which Fig. 1 is a vertical section through a spring assembly and its environment in a vehicle, embodying my invention, Fig. 2 is a vertical section through a spring casing having a spring fitted therein and partially broken away and with shields attached, the shields being a modified form of those of Fig. 1, Fig. 3 is a view similar to Fig. 1 with further modified forms of shields, Fig. 4 is an elevation of a spring equipped with a further form of shield, and Fig. 5 is a diagram showing the manner of deflection of the shield of Fig. 5.

More particularly, I indicates a truck frame side rail adapted to be supported from an axle through the opening 2 of a journal bearing housing 3 by means of a plurality of journal springs, one of which is shown in Fig. 1, each of which is contained by a spring retainer 4 integral with the housing 3. The retainer 4 in this case is normally the load receiving means of the spring, the gravity loading thereon being imposed by a center shaft 5 concentric with the member 4 and integrally secured to the member 1. Between these two members the spring resides, being inserted under radial compression.

The spring is composed of alternate layers of metal 6 and rubber or equivalent material 7, surface bonded together. The innermost one of the layers 6 is in surface engagement with the shaft 5 and the outermost of the layers 6 is in surface engagement with the retainer 4. Since the metallic layers are concentric and parallel the elastic layers 7 therebetween resist relative vertical movement of the parts 4 and 5 in shear. The elastic elements are preferably under substantial radial compression to prolong the life of the bond between these layers and the layers 6. Immediately above the innermost of the layers 6 and fixed to the shaft 5 is a plate 8 having a plurality of shoulders or stops 9 for the purpose of progressively contacting the layers 6 to impart to the spring a predetermined load deflection rate.

The retainer 4 preferably extends well above the outermost layer 7 and is provided with a cylindrical exterior for engagement by a shield 10 which is made of rubber, rubber covered fabric, leather or any other suitable material, and which closely fits the exterior portion 11 of the stop plate 8. Obviously, the shield may fit tightly against the load imposing member 5 if the stop plate is omitted from the assembly. The shield is not drawn tightly but is made with an excess of material, as illustrated, to allow of substantial vertical movements between the members 4 and 5.

A lower shield 12 is also provided, being in the form of a disc of metal or other suitable material in the form illustrated in Fig 1, and snared between the outermost metallic layer 6 and the flange 13 of the retainer 4. This shield 12 does not contact the inside member 5, but has a clearance at 14 whereby the shield will not be deformed during relative movements of the members 4 and 5.

In operation, the shield 10 will guard the spring against entry of extraneous matter thereto. During relative vertical movements of the members 4 and 5 the volume of the enclosed space above the spring will change and the shield, if sufficiently deformable, can accommodate or correct for the change by expanding. If, however, the shield 10 be of a fairly heavy material it may be used as a pumping diaphragm and displace the air through longitudinal passages 15 through the spring provided for the purposes. The passage of air through the spring will cool the elastic material and the resistance offered to the flow, as determined by the size and number of the passages, can be regulated in the design to give a predetermined damping effect. The area of the clearance 14 can also be regulated in the design to provide a predetermined damping effect resulting from the displacement of air to and from the lower space enclosed by addition of the shield 12 or the clearance 14 may be sufficiently large to leave all damping functions to the shield 10.

In Fig. 1 the spring retainer is provided with an upstanding exteriorly cylindrical rim which may not be convenient in all cases. Fig. 2 illustrates a shield 10a similar to the shield 10 but adapted to fit interiorly of the spring retainer 4a. The spring, stop plate and other parts are the same and their description will not be repeated, corresponding parts being indicated by corresponding numerals with the letter *a* appended. The only other exception is in the lower shield 16 which differs from the shield 12 in that it resembles the shield 10, being attached to or snugly fitted over the exterior surface of the bottom of the retainer 4a and also snugly fitting the center shaft 5a for movement therewith.

The operation of this spring gives materially different results from the spring of Fig. 1 because the air enclosed by the two retainers 4a and the two shields is not replenished or vented, but is pumped back and forth through the passages, giving a damping effect which must be computed by the effect of both shields.

In Fig. 3 the shield 10b is similar to shields 10 and 10a except that it is secured to the top of the retainer 4b by a clamping ring 17 or other suitable means. The lower shield 18 is of some stiff material and is secured in the retainer 4b in exactly the same manner as described in connection with the shield 12 of Fig. 1. It is inclined or of generally frusto-conical shape with the small base removed. The shaft 5b extends through the opening formed by removal of the small base and has a clearance 20 for free relative movement. By this shape, any water which splashes into the space between the lower shield and the bottom of the spring can readily drain.

In Fig. 4 the shield 10c is shown as being secured to the spring cup 4c in the manner illustrated in Fig. 1, the lower portion 20 thereof being made cylindrical for the purpose. The remainder of the shield may be described as two integral frusto-cones 21 and 22. The advantages of this particular shape, which is the preferred form, is that it will be of neater appearance, it requires a minimum of material, its resistance to deflection can be better determined, it offers more resistance to deflection than the other forms for the same weight of material, and, therefore, is better suited to damping. In Fig. 5 it is diagrammatically illustrated that, as the shield deflects through the successive positions 23, 24, 25, 26 and that the deflection will be from successive circles on the frusto-cone 22. The cones are so proportioned that the maximum deflection will occur from the top of the cone 21 so that the cone 21 will never be thus deformed.

Various other modifications will suggest themselves to those skilled in the art and I, therefore, desire to be extended protection as defined by the appended claims.

What I claim is:

1. The combination of a spring composed of rubber or equivalent material of cylindrical form surface-bonded interiorly and exteriorly to metallic cylindrical members comprising load imposing and load receiving means for imposition of loading on said rubber in shear, and a shield extending from said load imposing member to said load receiving member covering an exposed end surface of the spring, said cover comprising two integral frusto cones with the free end of one cone attached to the other of said members.

2. The combination of a spring having an air passage therethrough and composed of rubber or equivalent material of cylindrical form surface-bonded interiorly and exteriorly to metallic cylindrical members comprising load imposing and load receiving means for imposition of loading on said rubber in shear, a flexible air trapping shield extending from said load imposing member to said load receiving member covering one exposed end of the spring, said spring having a passage through which the trapped air flows to the other end of the spring, and a rigid shield covering the other exposed end of said spring, said rigid shield being arranged to trap air in one of said members and having a clearance with the other member which regulates the exhaust of trapped air to vary the original spring rate.

3. The combination of a spring having a springing element of rubber or equivalent material of cylindrical shape, a retainer of cylindrical interior into which said spring is inserted, a central shaft axially through said element, said element being under substantial radial compression between said retainer and said shaft and having an air passage therethrough, said spring being normally vertical and operative to impose shear loading on said element, and an air trapping shield for the upper end of said spring secured to said retainer and to said central shaft, said air passage constituting a restricted delivery means for the entrapped air whereby the original spring rate of the spring is varied.

4. The combination of a spring having a springing element of rubber or equivalent material of cylindrical shape, a retainer of cylindrical interior into which said spring is inserted, a central shaft axially through said element, said element being under substantial radial compression between said retainer and said shaft and having air passages therethrough, said spring being normally vertical and operative to impose shear loading on said element, and a shield for the upper part of said spring secured to the exterior of said retainer and to said central shaft to trap air therebetween, said passages restricting the delivery of entrapped air to alter the original spring rate of the spring.

5. The combination of a spring having a springing element of rubber or equivalent material of cylindrical shape, a retainer of cylindrical interior into which said spring is inserted, a central shaft axially through said element, said element being under substantial radial compression between said retainer and said shaft and having air passage therethrough, said spring being normally vertical and operative to impose shear loading on said element, and a shield for the upper part of said spring secured to the interior of said retainer and to said central shaft for trapping air therebetween, said passage having a predetermined area such that it coacts with the air trapping shield to alter the normal spring rate of the spring.

6. The combination of a spring having a springing element of rubber or equivalent material of cylindrical shape, a retainer of cylindrical interior into which said spring is inserted, a central shaft axially through said element, said element being under substantial radial compression between said retainer and said shaft and having an air passage therethrough, said spring being normally vertical and operative to impose shear loading on said element, and a shield for the upper part of said spring secured to the top surface of said retainer and to said central shaft, said shield trapping air with said container and said passage restricting the flow of air therefrom to vary the original spring rate of the spring.

7. The combination of a spring composed of a plurality of alternate concentric layers of rubber and metal, a cylindrical retainer into which said spring is inserted, a shaft axially through said spring, the spring being of conical shape at one end, a stop plate carried by said shaft and having a plurality of concentric steps for contact with said metallic layers to alter the original spring rate, a shield of flexible material for the conical end of said spring, said shield together with said cylindrical retainer constituting a fluid pump, and means for restricting the delivery of the pump whereby the original rate of the spring is further altered.

8. The combination of a spring composed of a plurality of alternate concentric layers of rubber and metal, a cylindrical retainer into which said spring is inserted, a shaft axially through said spring, the spring being of conical shape at one end, a stop plate carried by said shaft and having a plurality of concentric steps for contact with said metallic layers to alter the original spring rate of the spring, a shield of flexible material for the conical end of said spring, connected at its outer edge to said retainer and at its inner edge to the exterior of said stop plate, said cover together with said retainer constituting a fluid pump, and means for restricting the delivery of said pump whereby the original spring rate of the spring is further altered.

9. The combination of a spring having a springing element of rubber or equivalent material of cylindrical shape, a retainer of cylindrical interior into which said spring is inserted, a central shaft axially through said element, said element being under substantial radial compression between said retainer and said shaft, and a shield for one end of said spring having its outer edge fixed to said retainer and its inner edge adjacent and slightly spaced from said central shaft, said shield together with said retainer constituting a fluid pump, and the space at the inner edge of the shield constituting a delivery restricting means for the pump whereby the original spring rate of the spring is altered.

10. The combination of a spring having a springing element of rubber or equivalent material of cylindrical shape, a retainer of cylindrical interior into which said spring is inserted, a central shaft axially through said element, said element being under substantial radial compression between said retainer and said shaft, and a shield of stiff material and of generally frusto-conical shape having its outer edge fixed to said retainer and its small base removed for extension of said central shaft therethrough, said shield together with said retainer constituting a fluid pump, and the central shaft coacting with the wall of the opening through which it extends to constitute delivery restricting means, whereby the original spring rate of the spring is varied.

11. The combination of a spring having a springing element of rubber or equivalent material of cylindrical shape, a retainer of cylindrical interior into which said spring is inserted, a central shaft axially through said element, said element being under substantial radial compression between said retainer and said shaft, and a shield of stiff material and of generally frusto-conical shape having its outer edge fixed to said retainer and its small base removed for extension of said central shaft therethrough, the area of the removed portion of said small base being greater by a predetermined amount than the cross-sectional area of said shaft whereby said shaft freely passes therethrough.

12. The combination of a spring composed of a plurality of alternate concentric layers of rubber and metal, a cylindrical retainer into which said spring is inserted, a shaft axially through said spring, the spring being of conical internal shape at one end, a shield for that end fixed to said retainer at its outer edge and encircling said central shaft at its inner edge, said shield trapping a volume of air within the conical end of the spring, and means for restricting displacement of said entraped air when the spring is deflected whereby the original spring rate of the spring is varied.

13. The combination of a spring composed of a plurality of alternate concentric layers of rubber and metal, a cylindrical retainer into which said spring is inserted, a shaft axially through said spring, the spring being of conical internal shape at one end, and a shield for that end fixed to said retainer at its outer edge and encircling said central shaft at its inner edge and slightly spaced therefrom whereby said shaft passes freely therethrough, said spring and shield together constituting a fluid pump, and the space between the shield and said shaft constituting a restricted delivery means whereby the original spring rate of the spring is varied.

14. The combination of a spring composed of a plurality of alternate concentric layers of rubber and metal, a cylindrical retainer into which said spring is inserted, a shaft axially through said spring, the spring being of conical internal shape at one end, a shield for that end fixed to said retainer at its outer edge and connected to said central shaft at its inner edge, said shield together with said spring constituting a fluid pump, and means restricting the delivery of said pump whereby the original rate of the spring is varied.

15. The combination of a spring having a surface displaceable under normal springing movements, a housing overlying said surface and with respect to which said surface moves, said surface and said housing together constituting a fluid pump, and means restricting the delivery of said pump whereby the original spring rate of said spring is altered.

16. The combination of a spring comprising a cylindrical springing element of rubber or equivalent material, means imposing axial loading on said element whereby shear stresses are imposed therein and whereby the central portion of said element is displaced with respect to the periphery thereof, a cover for one end of said element entrapping a volume of air therewith, and vent means restricting the release and replenishment of said volume of air during movements of said element under shearing forces.

17. The combination of a spring comprising a cylindrical springing element of rubber or equivalent material, means imposing axial loading on said element whereby shear stresses are imposed therein and whereby the central portion thereof is displaced with respect to the periphery thereof, means enclosing one end of said element entrapping a volume of air therewith, said means and said element moving relatively during movement of said element under shearing forces, and vent means directly through said element through which said volume of air is reduced and replenished.

18. The combination of a cylindrical springing element having passages offset from and parallel to its axis extending therethrough, concentric load imposing and load receiving members relatively axially movable to impose shear stresses in said element, a cover for each end of said element each connected to said load imposing and load receiving members respectively, said covers completely sealing said spring and a volume of air, said covers forcing the entrapped air back and forth through said passages during springing movements of said element.

EMIL H. PIRON.